United States Patent
Byers et al.

(10) Patent No.: US 6,959,184 B1
(45) Date of Patent: Oct. 25, 2005

(54) METHOD FOR DETERMINING THE SECURITY STATUS OF TRANSMISSIONS IN A TELECOMMUNICATIONS NETWORK

(75) Inventors: Charles Calvin Byers, Aurora, IL (US); Mark Alan Lassig, Naperville, IL (US); Steven Mark Miller, Batavia, IL (US); William Brohmer Paulson, Naperville, IL (US); Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/343,823

(22) Filed: Jun. 30, 1999

(51) Int. Cl.[7] ............................................. H04M 11/00
(52) U.S. Cl. ................... 455/410; 455/411; 455/552.1; 455/414.2; 709/229; 709/219; 709/225; 370/351; 370/353; 370/354
(58) Field of Search ................................ 455/410, 411; 343/357.1; 380/201; 713/201; 370/352, 354, 370/356; 709/225

(56) References Cited

U.S. PATENT DOCUMENTS

| | | | | |
|---|---|---|---|---|
| 5,784,555 | A | 7/1998 | Stone | 395/200.5 |
| 5,862,475 | A * | 1/1999 | Zicker et al. | 455/419 |
| 6,134,315 | A * | 10/2000 | Galvin | 379/219 |
| 6,292,833 | B1 * | 9/2001 | Liao et al. | 709/229 |
| 6,445,794 | B1 * | 9/2002 | Shefi | 380/46 |
| 6,553,496 | B1 * | 4/2003 | Buer | 713/200 |

FOREIGN PATENT DOCUMENTS

| | | |
|---|---|---|
| EP | 0 827 318 A2 | 8/1997 |
| EP | 1 046 977 A2 | 10/2000 |
| WO | WO 00/67548 | 11/2000 |

* cited by examiner

Primary Examiner—William Trost
Assistant Examiner—Danh C Le

(57) ABSTRACT

A method for determining the security level associated with transmissions in a telecommunications network includes means for alerting parties of the security status of the transmission. When a route interconnecting the parties includes an insecure link, an alert is provided so that the parties are aware of the insecure nature of the call before communications begin. Alternatively, the parties may elect to decline or alter content of the communications to preserve integrity.

14 Claims, 4 Drawing Sheets

METHOD FOR DETERMINING THE SECURITY STATUS OF TRANSMISSIONS IN A TELECOMMUNICATIONS NETWORK

TECHNICAL FIELD

This invention relates to telecommunications networks, and more particularly, to ascertaining information about and providing an indication of the security status of transmissions in such telecommunications networks.

BACKGROUND OF THE INVENTION

Modern day telecommunications networks are a web of a variety of nodes for delivering information from sender to recipient. In traditional public switched telephone networks (PSTNs), these nodes are circuit switched connections for relaying information along presumably secure, well-established routes. A relatively new phenomenon in telecommunications is the emergence of packet data networks. Transmission routes in packet data networks are dynamic and allow flexibility in information flow so that data is transmitted along paths most efficient for delivery. Indeed, the hallmark of the packet data network is its method of routing which ensures greater bandwidth for delivery of information.

An issue associated with all telecommunications transmissions, but more pronounced in packet data networks (due to the unpredictable nature of packet transmission routes), is the security of the node through which the information passes. This is because unauthorized interception of transmission is possible at many points along a route using relatively unsophisticated equipment. In some applications, such as military or corporate communications, a secure transmission is essential. With the increasing convergence of packet data and circuit switched networks, the likelihood of transmitting information via a network node which is subject to interception is significant. Therefore, traditional assumptions about the security of telecommunications networks, or the nodes contained therein, are no longer warranted.

SUMMARY OF THE INVENTION

It is recognized that most users of telecommunications services expect some degree of privacy when transmitting information across a network. There is currently a need for alerting users when a transmission is subject to interception due to its traversal of an insecure node in a telecommunications network.

This need is addressed and a technological advance is achieved in the telecommunications art by alerting senders or recipients whenever information has traversed at least one insecure node in a telecommunications network. Upon receipt of the security status of the node, the parties may elect to continue communication or decline transmission. A node is considered insecure if it does not have the capability to send or receive private or encrypted information or passes through facilities not absolutely controlled by a network provider. Circuit switched transmissions are private but not usually encrypted.

More particularly, an originating system identifies a path to an end destination. If any portion of the path includes insecure links or nodes, the intended recipient of the transmission is alerted. The recipient may then elect to receive the call, using caution not to divulge confidential matters, or decline the call. Alternatively, each insecure node of the transmitting network issues a signal indicating its insecure status. The originating or terminating party can then elect to abort the transmission.

A variety of mechanisms for alerting the caller or recipient of the insecure nature of a call are available. For example, an insecure transmission may be denoted by a special message on the caller identification display, distinctive ringing, an audible message or a periodic audible tone. Advantageously, all parties involved in a transmission are actually informed of the security level of the network supporting the transmission so that intelligent decisions about content can be made.

DETAILED DESCRIPTION

Figure 1:
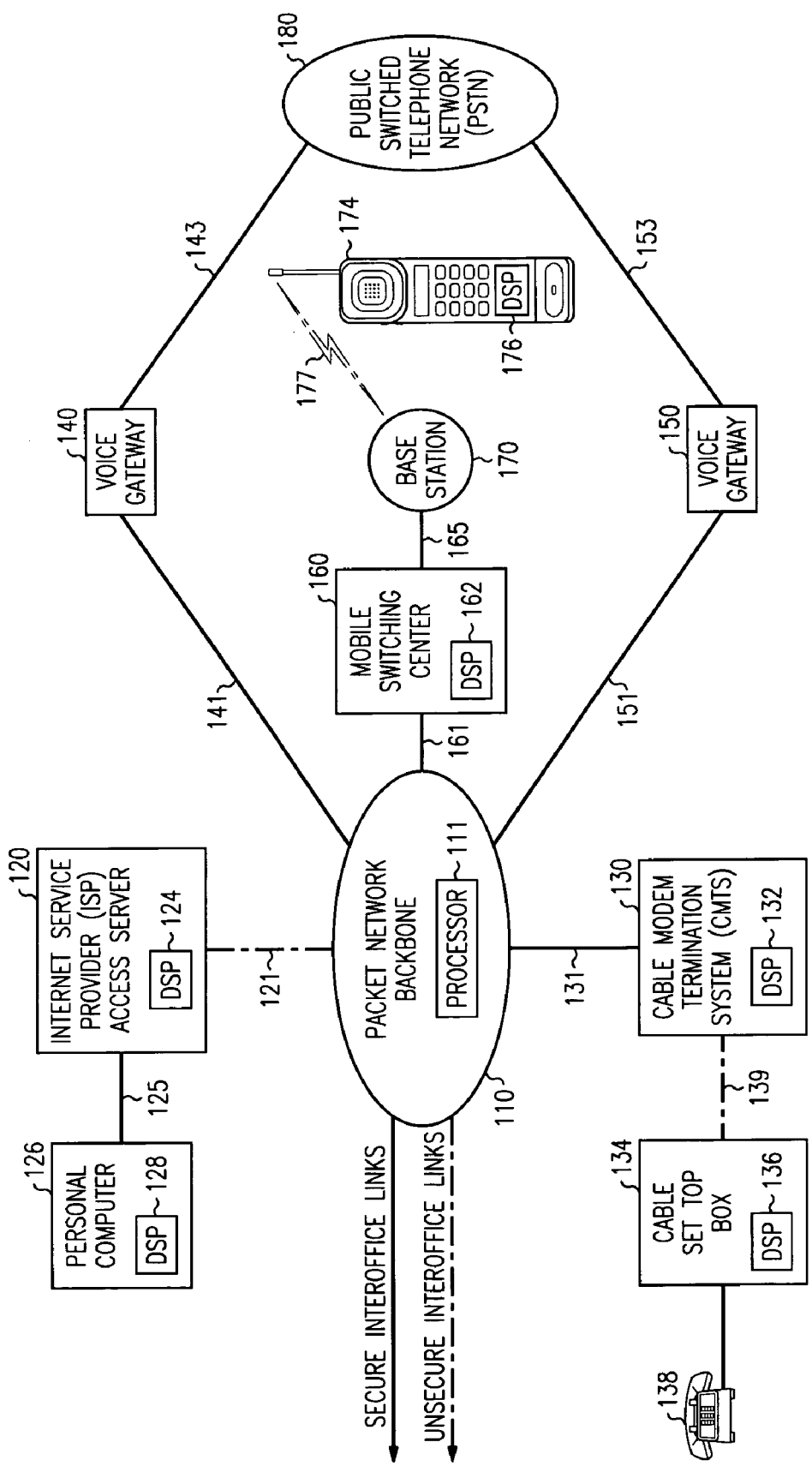
FIG. 1 is a simplified block diagram of a telecommunications network in which the method of the present invention may be practiced.

FIG. 1 is a simplified block diagram of telecommunications network 100 comprising packet (or cell) network backbone 110 interconnected to internet service provider (ISP) access server 120, cable modem termination system 130, first voice gate 140, second voice gateway 150 and mobile switching center 160 via links 121, 131, 141, 151 and 161, respectively. In this diagram, insecure links 121, 139 and 177 are denoted via dashed lines.

Among other components which are known in the art, packet network backbone 110 includes processor 111 for implementing data transmission procedures and security maintenance protocols as described herein. ISP access server 120 includes digital signal processor 124 for security maintenance protocols as described below. ISP access server 120 serves personal computer 126 by established link 125. In this embodiment, personal computer 126 includes digital signal processing capability unit 128. Packet network backbone 110 is interconnected to cable modem termination system 130 via secure link 131. Cable modem termination system 130 includes digital signal processor 132 for security maintenance protocols.

Cable set top box 134 includes its own digital signal processor 136 and serves telephone 138. The cable set top box is interconnected to cable modem termination system 130 via insecure link 139. First voice gateway 140 is interconnected to PSTN 180 via link 143 while second voice gateway 150 is interconnected to the PSTN via link 153. The PSTN serves subscribers of traditional circuit switched network services. Voice gateways 140 and 150 allow these subscribers to communicate with subscribers of packet network backbone services or cable subscribers, such as those who use telephone 138. First voice gateway 140 and second voice gateway 150 are interconnected to the packet network backbone via secured links 141 and 151, respectively. It is well known that the network topology of circuit switched connections enhances security but packet transmissions are more subject to interception.

Mobile switching center 160, including digital signal processor 162, serves base station 170 by established link 165. Base station 170 serves mobile terminal 174 over insecure air interface 177. Mobile terminal 174 includes its own digital signal processor 176 for security maintenance protocols.

All secure nodes have digital signal processors capable of encryption or decryption of information. In this example, all digital signal processors have the ability to send information regarding node security status to other network nodes.

Figure 2:
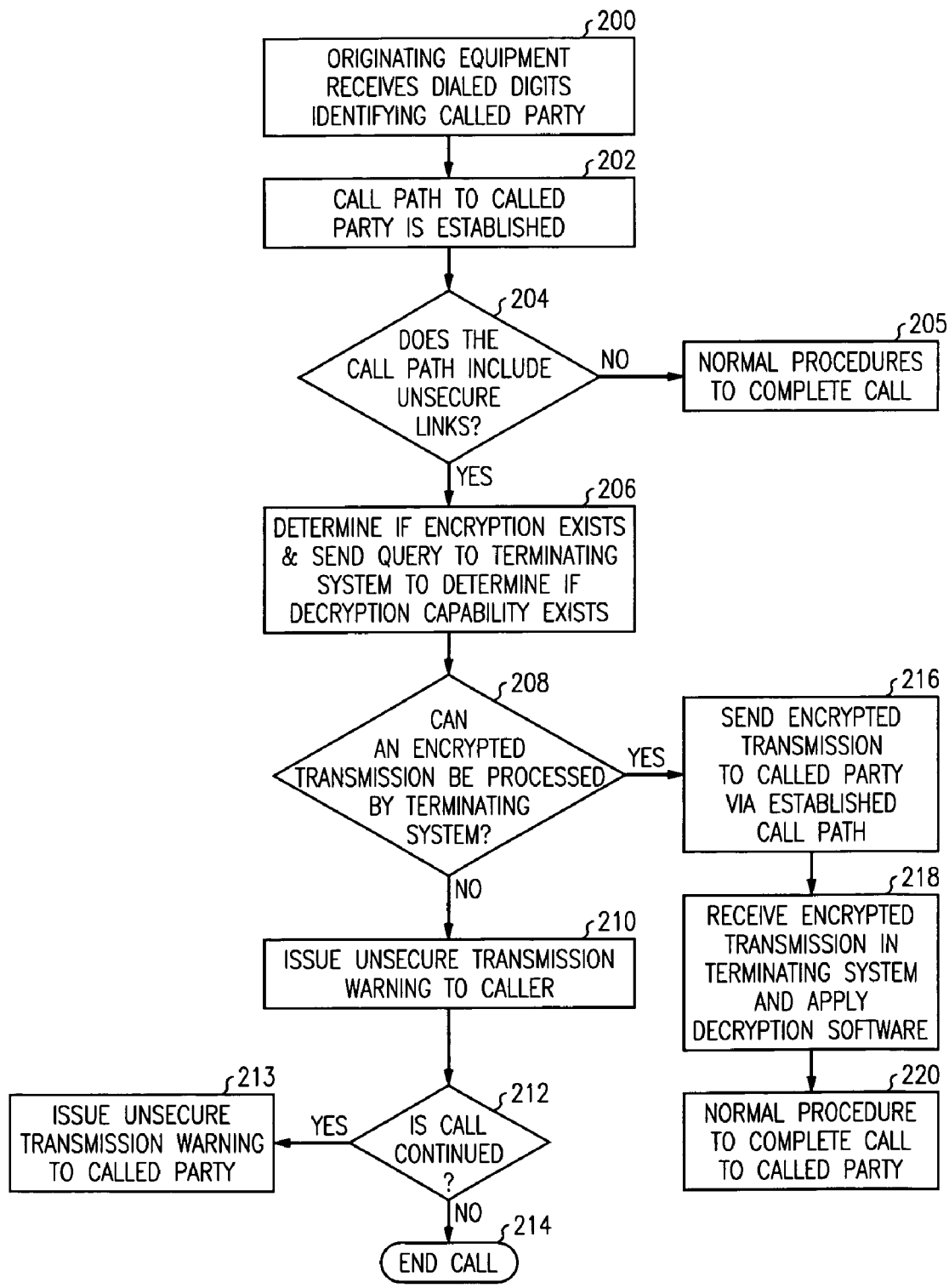
FIG. 2 is a call flow diagram illustrating steps performed in one embodiment of the present invention.

FIG. 2 illustrates the steps performed in telecommunications network 100 in accordance with one embodiment of the present invention. Although the example describes a voice call, those skilled in the art will recognize that any form of communication connection may be applied. The process begins in step 200 in which an originating system, such as cable set top box 134, receives dialed digits identifying a called party (e.g., the user served by personal computer 126). In step 202, the originating system establishes a call path to the called party. In this case, assume the call path comprises links 139, 131, 121 and 125.

In decision step 204, it is determined whether the call path includes insecure links. If the outcome of decision step 204 is a "NO" determination, the process continues to step 205 in which the call is processed to completion. If, as in this case, the outcome of decision step 204 is a "YES" determination, the process continues to step 206 in which the originating system determines if it has encryption capability and sends a query to the terminating system to determine if decryption capability exists at the end destination. In this example, the cable set top box does not have encryption capability. Therefore, it does not matter if the end destination has decryption capability. However, to illustrate this step, assume that the set top box issues a query to ISP access server 120 to determine whether personal computer 126 includes a digital signal processor 128 for decryption of a transmission. In this example, digital signal processor 128 is capable of decryption. If an originating system does not have encryption capability, it is likely to use the process described in FIG. 4 (i.e., finding a completely secure path).

The process continues to decision step 208 in which it is determined whether the system of the end destination can process an encrypted message. In this example, ISP access server 120 queries personal computer digital signal processor 128 to determine whether it has decryption capability. If the outcome of decision step 208 is a "NO" determination, the process continues to step 210 in which the originating system issues an insecure transmission warning to the caller using telephone 138. In decision step 212, the originating system determines if the caller wishes to continue the call. If the outcome of decision step 212 is a "NO" determination, the process ends in step 214. If the outcome of decision step 212 is a "YES" determination, the process continues to step 213 in which an insecure transmission warning is issued to the called party served by personal computer 126 prior to making the call connection. If the outcome of decision step 208 is a "YES" determination, the process continues to step 216 in which the originating system (if capable of doing so) sends an encrypted transmission to the called party via the established call path. In this example, the originating system cannot encrypt messages so the transmission is sent with a warning. In step 218, the called party receives the encrypted transmission and, if applicable, decryption software is applied. In step 220, the call is completed with normal processing after the received transmission is decrypted. Of course, if both originating and terminating systems have encryption capability, all transmissions between the parties are encrypted and secure.

Figure 3:
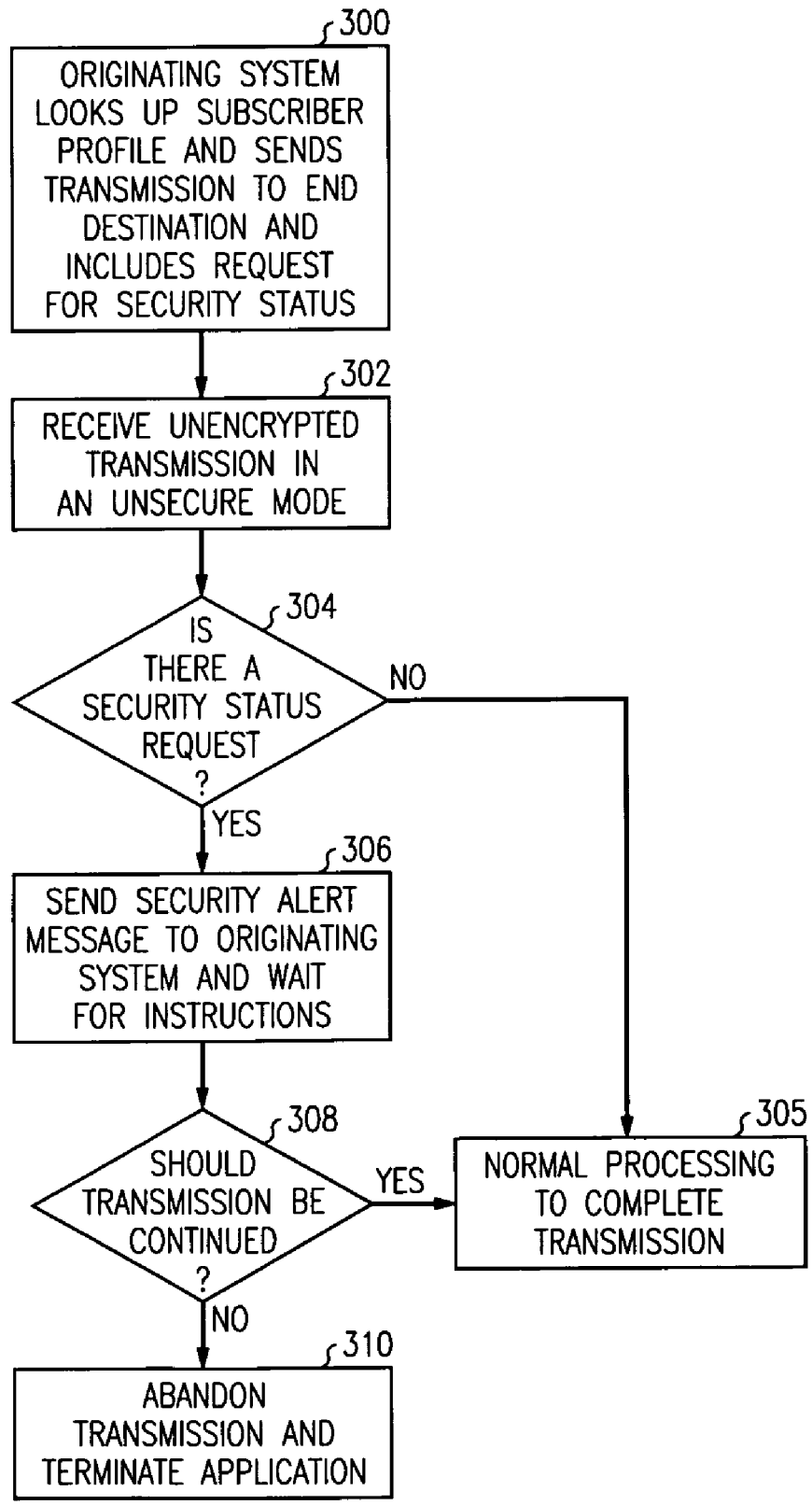
FIGS. 3 and 4 are call flow diagrams illustrating steps performed in second and third embodiments of the present invention.

FIG. 3 is a flow diagram illustrating the steps performed in telecommunications network 100 from the perspective of an insecure network node. FIG. 3 should be viewed in conjunction with FIG. 4.

The process begins in step 300 in which an originating system looks up a subscriber security profile for the caller and if the caller subscribes to enhanced security services, sends a transmission to an end destination with a request for security status of each node in the route from originating to termination systems. The request for a security status is appended to packet data and identifies the address of the originating system. Security status messages are returned to the originating system in accordance with a security maintenance protocol stored in the node. The security status protocol is based on customer-specific security profiles stored in the originating system processor or an external data base. Various parameters may be established based on subscriber features. For example, the customer may specify certain transmissions (e.g., transmissions after 5:00 p.m.) in which no security checks are required.

The process continues to step 302 in which an insecure node in the network receives the unencrypted transmission from the originating system. In decision step 304, the node determines if the transmission includes a security status request. If the outcome of decision step 304 is a "NO" determination, the process continues to step 305 in which normal procedures are undertaken to complete the transmission. If the outcome of decision step 304 is a "YES" determination, the process continues to step 306 in which the node sends a security alert message to the originating system and waits for further instructions from the system. Processing of security alert messages is described in FIG. 4.

In decision step 308, the node which sent the security alert message determines if the transmission should be continued based on instructions received from the originating system. If the outcome of decision step 308 is a "YES" determination, the process returns to step 305 in which normal procedures are used to complete the transmission. If the outcome of decision step 308 is a "NO" determination, the process ends in step 310 in which the transmission is abandoned and all applications are terminated.

Figure 4:
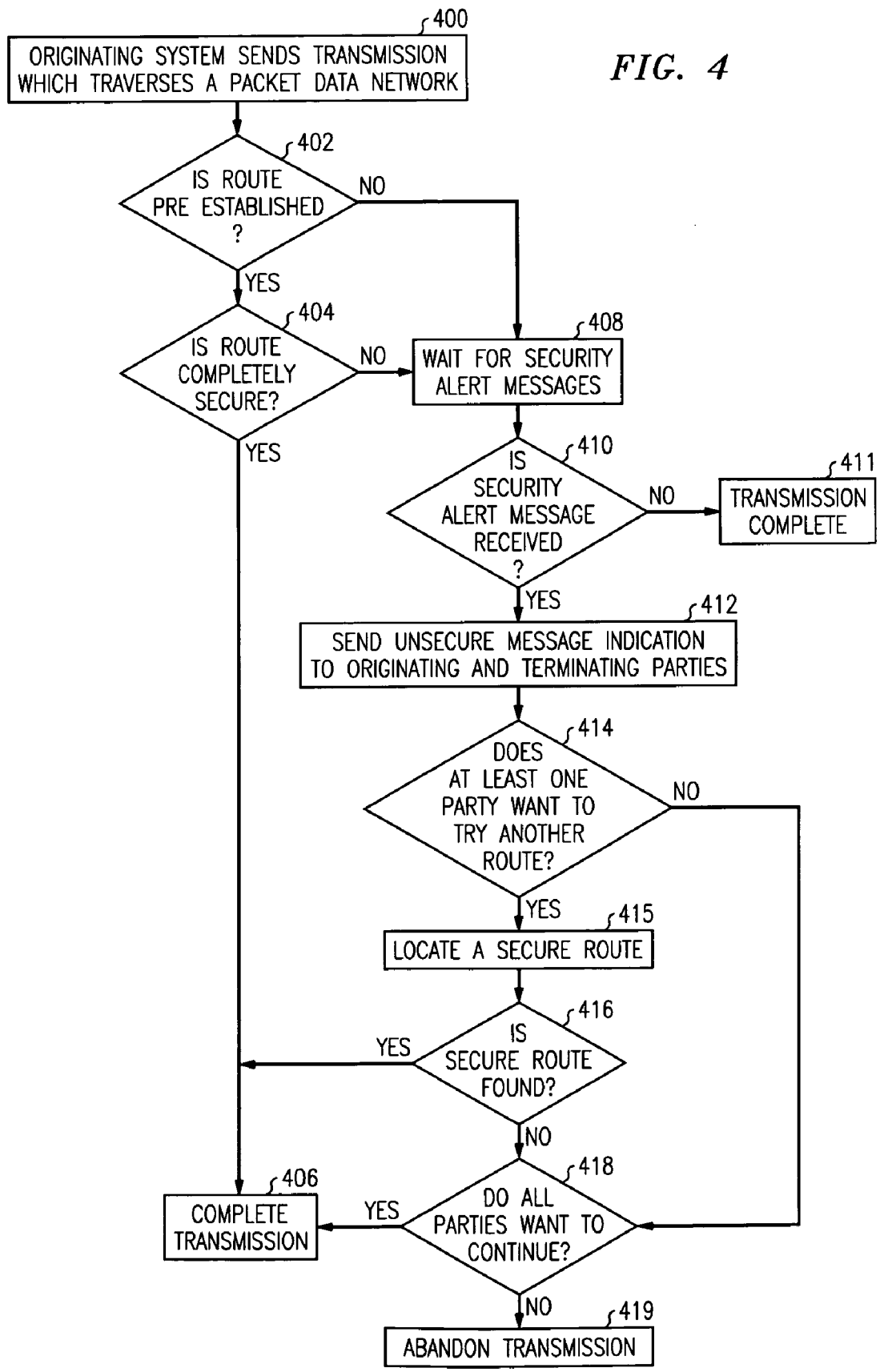

FIG. 4 illustrates the steps performed in telecommunications network 100 from the perspective of an originating system.

The process begins in step 400 in which an originating system sends a transmission along a route traversing a packet data network. The transmission includes a request for security status confirmation. In decision step 402, the originating system determines if the transmission route is pre-established. If the outcome of decision step 402 is a "YES" determination, the originating system determines if the pre-established route is completely secure. If the outcome of decision step 404 is a "YES" determination, the process continues to step 406 in which normal transmission procedures occur. In some instances, a route which was originally identified as secure becomes insecure due to last minute route changes (e.g., traversal of the world wide web for routing efficiency) or entry into another service provider's realm, such as a roaming mobile terminal. Thus, in some embodiments, the originating system monitors the transmission route for security alert signals so that the caller and called party can be notified if a previously secure route becomes insecure. If the outcome of decision step 402 is a "NO" determination, the process continues to step 408 in which the originating system waits for security status alert messages after sending the transmission. Processing of security status requests is described in FIG. 3.

In decision step 410, the originating system determines if any security alert messages are received. If the outcome of decision step 410 is a "NO" determination, the process continues to step 411 in which the originating system assumes the transmission has been completed without security compromises. If the outcome of decision step 410 is a "YES" determination, the process continues to step 412 in which the originating system responds to the received security alert message by sending an insecure transmission warning to the originator of the transmission and the proposed recipient of the transmission. The insecure message indication may take the form of an audible tone, audible message, a visual display or a query screen on a personal computer. Also, an audible tone may be periodically inserted throughout the call to remind the parties of the insecure nature of the connection.

In decision step 414, the originating party determines if either party wants to try another transmission route based on the insecure transmission warning. If the outcome of decision step 414 is a "YES" determination, the process continues to step 415 in which the originating system attempts to locate a secure transmission route. In decision step 416, the originating system determines if a secure transmission route is found. If the outcome of decision step 416 is a "YES" determination, the process returns to step 406. If the outcome of decision step 416 is a "NO" determination, the process continues to decision step 418 in which the originating system determines if parties want to continue transmission. If the outcome of decision step 418 is a "NO" determination, the process continues to step 419 in which the transmission is abandoned and the application is terminated. If the outcome of decision step 418 is a "YES" determination, the process returns to step 406.

The embodiments described above include customer premises equipment (such as telephones, fax machines or personal computers) with mechanisms for responding to security protocols. More particularly, the customer premises equipment is able to send signals indicating that a call or transmission should continue or be discontinued based on the security level of the transmission. Advantageously, all embodiments allow all parties involved in a call or information exchange to ascertain the level of security associated with a communication prior to actual transmission. In this manner, the security of the exchange is enhanced by the knowledge of the security level associated with the call.

It is to be understood that the above description is only of one preferred embodiment of the invention. Numerous other arrangements may be devised by one skilled in the art without departing from the scope of the invention. The invention is thus limited only as defined in the accompanying claims.

What is claimed is:

1. A method for providing secure transmissions in a telecommunications network comprising the steps of:
   establishing a route from an originating network node to a terminating network node;
   determining whether at least a portion of the route includes a link that does not send or receive private or encrypted information or that uses facilities not absolutely controlled by a network provider; and
   responsive to the step of determining whether at least a portion of the route includes said link and prior to connection to said terminating network node, providing an alert of a security status of the route to a calling party using the originating network node
   issuing the alert when a previously secure route becomes insecure; and
   wherein providing the alert includes issuing a message on an identification display associated with one of a station associated with the terminating network node and the calling party.

2. The method of claim 1 further comprising the step of: completing a call after the alert has been provided.

3. The method of claim 1 wherein providing the alert includes issuing a distinctive ring at a station associated with the terminating network node.

4. The method of claim 1 wherein providing the alert includes providing an audible voice message.

5. The method of claim 1 wherein providing the alert includes using an audible tone.

6. The method of claims 4 or 5 wherein providing the alert includes providing a periodic alert.

7. The method of claim 1 wherein providing the alert includes a query screen on a personal computer.

8. A method for providing secure transmissions in a telecommunications network comprising the steps of:
   a. establishing a route from a calling party to a called party;
   b. determining whether at least a portion of the route includes a link that does not send or receive private or encrypted information or that uses facilities not absolutely controlled by a network provider;
   c. responsive to a positive result in said determining step, further determining whether a secure connection may be established between said calling party and said called party; and
   d. responsive to a positive result in said determining step and a negative result in said further determining step, providing an alert of a nature of the route to said calling party;
   e. responsive to a positive result in said determining step and a negative result in said further determining step, establishing a new route between said calling party and said called party.

9. The method of claim 8 wherein said telecommunications network includes at least one intermediate node in said route from said calling party to said called party, and wherein step c. thereof further comprises the step of:
   transmitting a message including a security status request through each of said at least one intermediate node.

10. The method of claim 8 wherein said telecommunications network includes at least one intermediate node in said route from said calling party to said called party, and wherein step c. thereof further comprises the step of:
    for each of said at least one intermediate node, if such node is insecure, receiving a message indicating such node is insecure.

11. The method of claim 8 further comprising the step of:
    f. establishing a secure connection between said calling party and said called party.

12. The method of claim 8 further comprising the step of:
    e. establishing a connection between said calling party and said called party despite a determination that a secure connection cannot be established.

13. The method of claim 8 wherein said alert is provided to said calling party, and the method further comprises the steps of:
    e. receiving authorization from said calling party, after said calling party has received said alert, to maintain a connection between said calling party and said called party.

14. The method of claim 8 wherein said alert is provided to said calling party, and further comprises the steps of:
    f. receiving authorization from said calling party, after said calling party has received said alert, to establish a connection between said calling party and said called party over the new route.

* * * * *